United States Patent Office 3,441,132
Patented Apr. 29, 1969

1

3,441,132
CONTAINER SORTING APPARATUS
Gordon D. Browning, 19056 Stanton Ave.,
Castro Valley, Calif. 94546
Filed June 17, 1966, Ser. No. 558,376
Int. Cl. B07c 3/12; C22b 11/10
U.S. Cl. 209—72                    12 Claims

ABSTRACT OF THE DISCLOSURE

In order to monitor the internal vacuum of previously processed food containers, a wall portion of each container as it is transported along a conveyor is impulsively deflected by a magnetic field pulse and the resulting internal pressure dependent dynamic displacement of the container wall is concurrently detected by means of an electrostatic sensor. The output of the electrostatic sensor thus provides an electrical signal precisely proportional to the internal container pressure and is utilized in a preferred form of the invention to eject certain containers from the conveyor in response to a preselected threshold level of vacuum.

---

The invention relates to devices and systems for determining the presence or absence of required vacuum or pressure (above atmosphere) in closed hermetically sealed containers. A primary use of the present invention is in the food packing industry, although it may be used in other industrial applications where heremetically sealed vacuum or pressurized containers are involved.

In proportion to the growing population, the food packing industry must produce more and, therefore, faster and more accurate techniques must be provided in its quality assurance area. Of paramount concern is vacuum determination primarily in the canning industry where containers are vacated at relatively high vacuums. Vacuum packaging is primarily done on such foodstuffs as vegetables, fruits, fish and meat, where as many air molecules as possible are removed from the container so as to minimize the oxygen content to prevent oxidation of the product or support growth of harmful bacteria. In contrast to vacuum packaging, pressure packaging is required for such substances as beer and carbonated drinks, where, although less of a general concern, the sealed containers must be absolutely leakproof to maintain quality and non-spillage of products.

Most sealed containers, e.g. cans, jars and bottles are adapted for use with the present invention. Cans are primarily composed of sheet metal, tin plated steel or especially processed aluminum and are usually cylindrical and have seamed diaphragm-like ends. Jars composed primarily of glass are provided with mating metallic caps composed of either tinned steel or aluminum which may be screwed or pressed onto the lip of the jars against internal seals. Bottles are structurally similar to jars only usually having a smaller opening and therefore a smaller screwed or pressed on cap. The present invention will efficiently detect the vacuum or pressure of all such containers as long as their lid diameters are large enough and have a reasonable ability to flex in or out based on the relative internal pressures of the containers.

Previous systems and apparatus for detecting vacuum or pressure of sealed containers have either been inaccurate and unreliable or too slow for efficient production line operation.

An object of the present invention is to provide a container sorting apparatus of the character described which will afford a fast, accurate and reliable vacuum or pressure determination of moving containers travelling at full speed required in modern canning production lines and which will not impede or restrict the moving containers in their conveyed paths.

Another object of the present invention is to provide a container sorting apparatus of the character above which may be adapted for use on a wide variety of containers of given size and shape.

A further object of the invention is to provide a container sorting apparatus of the character described which will afford an automatic ejection of substandard containers and which will additionally provide a continuous display and recording of the vacuum or pressure condition of each container moving through the production line.

Still another object of the present invention is to provide a container sorting apparatus which will automatically compensate for variations in temperature of the containers on the line so as to automatically eliminate erroneous rejection due to off-standard vacuum or pressure readings due solely to temperature changes.

The invention possesses other objects and features of advantage, some of which of the foregoing will be set forth in the following description of the preferred form of the invention which is illustrated in the drawing accompanying and forming part of the specification. It is to be understood, however, that variations in the showing made by said drawing and the description may be adopted within the scope of the invention as set forth in the claims.

Referring to said drawings (3 sheets):

Figure 1:
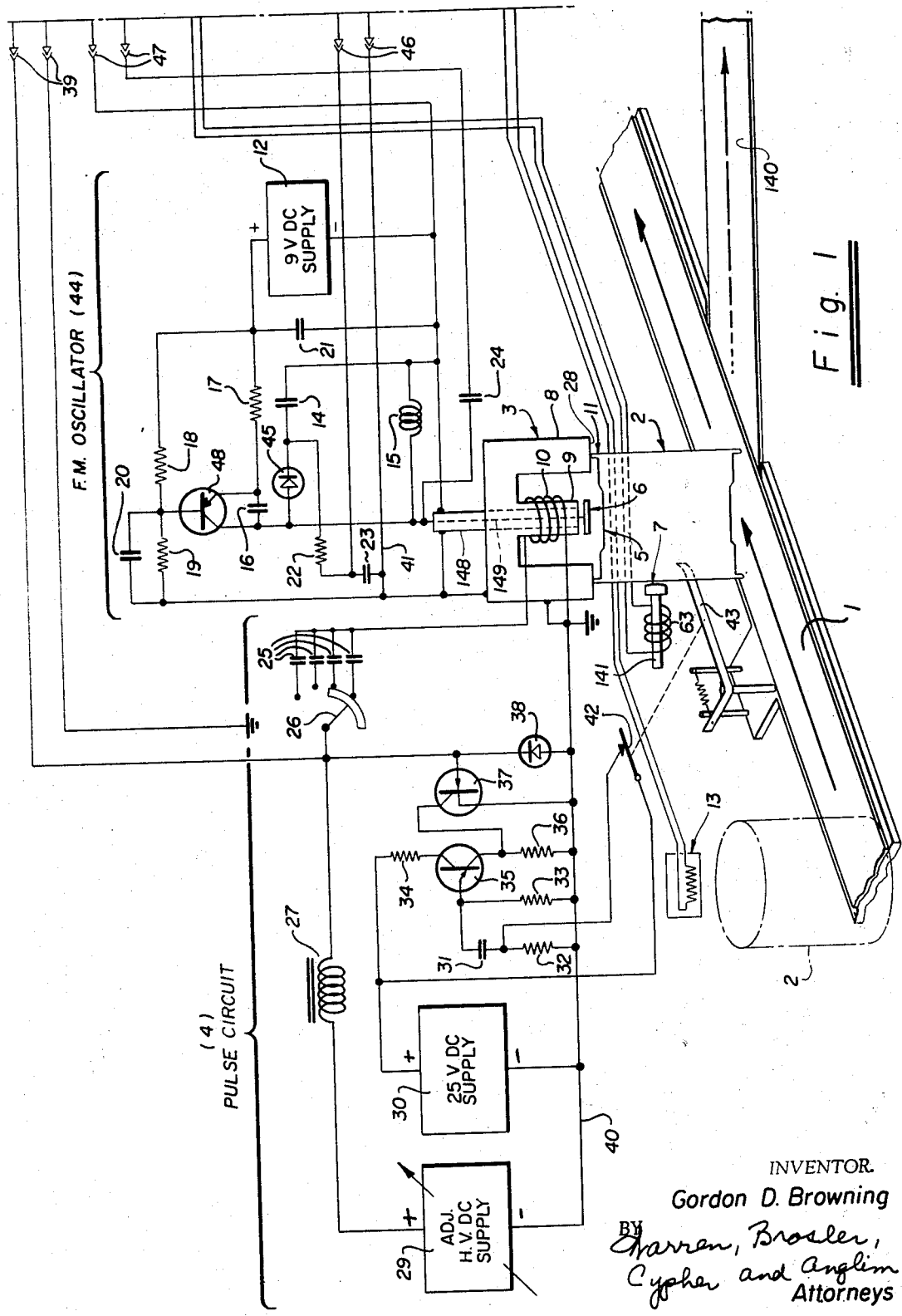
FIGURE 1 is a diagrammatic representation and schematic diagram of a portion of a container sorting apparatus constructed in accordance with the present invention.

The container sorting apparatus of the present invention comprises, briefly, a magnetic field generating device 3, a conveyor 1 for transporting containers 2 to be sorted to device 3, means 4 energizing device 3 upon alignment of a container 2 therewith for flexing a wall 5 of the container as a function of internal container pressure, electric pick-up means 6 sensing displacement of container wall 5, and container ejector means 7 connected to pick-up means 6 and responsive to a signal of predetermined magnitude therefrom to reject container 2 from conveyor 1. As noted in the foregoing, container wall 5 will normally be the end wall or lid of the container and which will flex in and out easily when the container's internal pressure is close to its exterior or atmospheric pressure. In accordance with the present invention, flexing or movement of the lid is effected by a magnetic or an induced electromotive force. Since the natural pressures opposing movement of the lid in a case of pressurized or vacated containers are produced by spongy air or gas molecules the force required to displace the lid will be a function of internal pressure. If the force on the center of the lid is derived from a constant energy source it is, therefore, constant, the displacement of the lid versus pressure differential on opposite sides of the lid will be inversely proportional to each other.

Since in accordance with the present invention, a magnetic field is used for displacement of the lid, the lid's composition is preferably of a ferromagnetic material in order to achieve maximum efficiency. Also as a feature of the present invention a pulsed magnetic field is used having a changing flux condition, and hence may be effectively used to displace lids of non-ferromagnetic material where a resultant force can be obtained due to the induced electrical circulating currents within the lid.

The magnetic field generating device 3 includes a cylindrical magnetic field piece having a diameter generally corresponding to the diameter of containers to be sorted and a central core piece 9 which carries field winding 10. The magnetic device is supported in an elevated inverted position as shown in FIGURE 1 so that conveyor 1 will transport containers 2 into vertical alignment under the device with the upper rim 11 of the container in opposed relation to the end face 28 of the cylindrical field piece 8 and with the core 9 generally aligned axially of the container and centrally of the end lid 5. Accordingly, when the high energy magnetic pulse is applied to the container, lid 5 will be pulsed upwardly by a displacement inversely proportional to the internal vacuum in the container.

Preferably, the displacement pick-up means 6 is located at the center core 9 so as to locate it directly above the center of lid 5. Accordingly, the magnetic flux will be so oriented as to pass on opposite sides of the pick-up. Since the displacement occurs at a rate producing an audio ring, any conventional style microphone or vibration pick-up may be used. Preferably, and as is here shown, an electrostatic type of pick-up means is employed and which co-functions with the container lid 5 to provide a capacitor varying in capacity as a function of displacement of the lid. This type of pick-up has the advantage of not actually touching the container.

A temperature sensing element 13 is preferably located upstream of the conveyor line for controlling the output displacement signal—in turn controlling the operation of the container ejector means as a function of container temperature so as to compensate for varying temperatures in a given run of containers. As will be understood, the amplitude of displacement of the lid will be greater as the temperature of the container is increased. Therefore, once the apparatus is set up to measure a given range of vacuum at a given temperature, any variation of this temperature should be electrically compensated for. Normally, these temperature variations once the equipment has been set up are minimal.

The pulse circuit means 4 is illustrated in FIGURE 1. High voltage derived from an adjustable regulated supply 29 (typically 300–600 volts) is applied between a common negative side 40 and to one side of an inductance 27. A silicon controlled rectifier 37 and back-wave diode 38 are connected between the other side of inductance 27 and common line 40. Rectifier 37 is initially in a non-conductive state. This same DC voltage is also applied by selector switch 26 to a bank of capacitors 35 serving as an electric power storage means and which are charged up to a value equal to the supply voltage. Inductance 27 is larger than the inductance of winding 10 which is in series with the capacitor bank 25 and keeps charging current of the capacitors at a low value. A triggering circuit is used for discharging the capacitors 25 through winding 10 so as to produce a high energy magnetic pulse; and switch 26 offers a means for selecting the capacitance and hence the discharge time required for efficient pulsing of the lids. The triggering circuit includes a DC voltage supply 30 which is applied across a triggering device 35 with its associated load resistances 34 and 36 where this device initially is in its non-conducting state. The trigger device 35 is here a double-base or unijunction diode. Resistors 32 and 33 combined with capacitor 31 form a differentiating network where a step voltage produced across resistor 32 will be differentiated into a more narrow time-based pulse across resistor 33 at the input element of triggering device 35. In order to bring triggering device 35 into conduction, a positive pulse is required across resistor 33 at its input. Similarly, to bring the silicon controlled rectifier 37 into conduction, it is required that a positive "trigger" pulse be produced between the triggering element and common line 40 across load resistor 36. A positive step voltage derived from supply 30 across resistor 32 was obtained by closing of switch 42 which is mounted for closing by container 2 upon movement of the container into alignment with the magnetic device 3. Any suitable means may be employed closing switch 42 when container 2 moves into alignment with the magnetic device 3. As here shown, an actuator arm 43 is mounted to one side of conveyor 1 for pivotal movement toward and away from the center of the conveyor. Arm 43 is spring biased to swing toward the conveyor and is engaged and displaced in an opposite direction by can 2 as it moves into position under device 3. Switch 42 is mounted for closing by the latter displacement of arm 43 thereby applying a positive step voltage across resistor 32, producing a pulse across resistor 33 causing the trigger device 35 to conduct heavily momentarily and giving a positive trigger pulse to device 37 presented across resistor 36 thereby "firing" (causing to conduct quickly) silicon controlled rectifier 37. The voltage across rectifier 37 drops abruptly to almost zero and causes the capacitors 25 to discharge their stored energy into the solenoid coil 10.

Since coil 10 constitutes an inductance which is momentarily combined in parallel due to the firing of silicon controlled rectifier 37 with the capacitors 25, a sinusoidal oscillating current will be set up through capacitors 25 and coil 10. After the first quarter cycle of this alternating current has passed, the current reverses direction and therefore the voltage across silicon controlled rectifier 37 reverses and causes the silicon controlled rectifier to open. This entire impulse period typically approximates but one, or a few, milliseconds in time. At the time SCR 37 opens, the remaining backward swing produced by capacitors 25 and coil 10 is quenched by the forward conduction of the backward wave diode 38. Inductor 27 is chosen, as above noted, to have a considerably larger inductance than winding 10 and so limits current being drawn from supply 29 when SCR 37 conducts. After the conduction cycle of SCR 37, a current is drawn through inductor 27 to recharge rapidly capacitors 25 so as to bring the pulse circuit 5 into readiness to fire again by the time the next container arrives under the magnetic device 3.

By choosing the correct amount of capacitance through the capacitance bank selector switch 26, along with the value of inductance contained with coil 10, the rate of rise of the field may be controlled to sympathetically raise the lid 5 within a quarter of a cycle of the maximum resonant frequency determined for lids of a given run. Since the amount of charge on capacitors 25 determines the peak current through coil 10, it is possible to adjust the peak force on lid 5 by setting of the adjustable high voltage DC supply 29. Where detecting at low values of vacuum in container 2 is desired, supply 29 may be adjusted to a low value, and if detecting is required at a high value of vacuum, supply 29 may be adjusted to higher voltage. The output from supply 29 when set is constant (regulated) giving a consistent relationship between the amplitude of lid deflection and the vacuum in the container.

Capacitance pick-up plate 6 is insulated above ground of core 8 and common 41 and is connected to a frequency modulated oscillator tank circuit 44. The tank circuit of the FM oscillator 44 is made up of the capacity of capacitance plate 6 to ground as well as the voltage variable capacitance diode 45 (in series with capacitor 14) and RF inductor 15 in electrical parallel where common 41 is its grounded side. To minimize noise pick-up, an electrostatic tubing or shield 148 is grounded to common 41 and covers the inner conductor 149 for the pick-up plate 6. The oscillator is here powered by a 9-volt DC supply 12 the negative side of which is brought to ground common 41 and the positive side is connected to power the oscillator transistor 48 which is shown as a Colpitts oscillator configuration. A positive feed-back path is provided by capacitance 16 connected between the collector and the emitter of transistor 48 where resistor 17 makes up the required emitter dropping resistance. Resistors 19 and 18 make up the base DC biasing divider, where capacitor 20 provides RF by-passing at the base junction. Capacitor 21 provides RF by-passing of the supply voltage to ground common 41. DC bias voltage for the variable capacitance diode 45 appears by the DC drop across capacitance 14 and is brought in by way of RF decoupling resistor 22 connected to input connector 46 where capacitance 23 provides RF and noise by-passing to common 41.

When a displacement of lid 5 is provided, the capacitance between the probe 6 and lid 5 (virtually at ground) is increased and therefore the frequency of oscillator 44 is decreased. The lid 5 may be considered as the diaphragm of a momentary capacitance microphone frequency modulating oscillator whose output is coupled through capacitance 24 to the output connector 27 and then connected to an FM demodulator which may be used for direct read-out for detection of the momentary lid displacement as each container 2 is passed into registration with the solenoid 3. The center operating frequency of the FM oscillator 44 may be controlled by a DC bias voltage brought into connector 46 which is a few volts positive above common 41. This bias control voltage may be obtained from the output (automatic frequency control voltage) derived from the FM demodulator circuit.

As a feature of the present invention, the sensing of container pressure, and more particularly the deflection of lid 5, is effected without touching the lid. It is accordingly necessary that the sensing capacitance proble 6 be high enough to clear the highest part of the container thus permitting it to pass unobstructed under the sensing head.

It is then required in many cases, that the capacitance plate 6 be a considerable distance from the center of lid 5 when the container 2 is brought directly in center under core 3 as shown. In order that the FM oscillator 44 has a high sensitivity to capacitance changes due to the lid 5 deflections, it is required to have this oscillator operate with a high L to C ratio where all fixed distributor capacitances are kept at a minimum. For best results, it has been found that the FM oscillator 44 be operating in the VHF range, typically between 50 to 200 megacycles or higher. At these frequencies, the inter-connecting line to probe 6 becomes a considerable part of a resonant RF line. If the resonant frequency of the oscillator is so set that the probe line approximates a half wave in electrical length where voltage maximum exists at its input end (at the collector of oscillator transistor 48) as well as at the sensing end (capacitance plate 6) a system of high sensitivity to capacitance change due to lid 5 variations will result.

Since a height variation exists in container 2, as shown by its profile display, as it travels under its sensing head core 3 and capacitance plate 6, a variation of capacitance will be seen by the FM oscillator 44 due to the varying distance between probe 6 and the top of the container 2. Since the information desired is only when the container is brought centered under core 3 and capacitance plate 6, it is a further feature of the present invention that any read-out or control circuitry is turned off except while container 2 is centered and switch 42 is closed thereby giving a reading of strictly displacements due to the magnetic force upon lid 5. To meet this requirement, a negative going trigger or gate pulse is provided at connector 39 which is derived across SCR 37 when switch 42 closes and an output pulse provided through coil 10. The negative pulse from connector 39 may be used to gate the output derived from an FM demodulator as explained below.

The required demodulation and control circuitry mentioned above is shown in FIGURE 2. For the sake of simplicity circuitry or circuit functions well known in the art is shown here and in FIGURE 1 in block diagram form, along with all power supply and/or control voltages. As shown, the negative 12 volts above ground (common symbol 57) is derived from the 12-volt DC supply 122. The frequency modulated RF signal from oscillator 44 in FIGURE 1 obtained from connector 47 is fed to input connector 50 at the input of the RF mixer 53. The input signal from connector 50 is mixed with the RF signal provided from a local stable crysal controlled RF oscillator 54. The frequency of crystal oscillator 54 differs from that of the input frequency by the amount selected by an intermedaite frequency amplifier 55. This intermediate or difference frequency provided at the output of RF mixer 53 is fed to the input of IF amplifier 55, whose output is connected to the resonant primary of FM demodulator transformer 64. The FM demodulator circuit 56 comprises a basic ratio detector circuit and is composed of the ratio-type discriminator transformer 64 with its resonated secondary winding and tuning capacitor 67, ratio demodulator diodes 65 and 66, RF by-pass capacitors 68, 69 and diode load resistors 70, 71, 72 and 73, along with audio by-passing capacitor 74.

The output FM demodulator 56 is obtained across load potentiometer resistance 76, where one side is at ground 57. Resistor 75 comprises an RF decoupling resistance where capacitance 78 comprises an RF by-pass capacitor. When an unmodulated signal is present at the input 50 and the ratio discriminator transformer 64 is so properly aligned or tuned the DC output across resistor 76 is zero. If resistors 72 and 73 are made equal, but resistor 70 is less than 71, the DC output voltage across 76 will then be slightly positive under center frequency conditions. This positive voltage may be provided to the voltage variable diode 45 in the tank circuit of FM oscillator 44, FIGURE 1, as an automatic frequency controlling positive biasing voltage, and is connected to the AFC input connector 46, FIGURE 1, from the output connector 51 by way of the RF and audio integrating network consisting of resistor 77 and by-pass capacitor 79. This, then comprises a closed loop frequency controlling servo system to keep the FM oscillator 44 at a constant center frequency when the FM discriminator transformer 64 is properly phased so that the DC voltage across potentiometer 76 goes positive with a decrease in the FM oscillator's 44 frequency.

When container 2 in FIGURE 1 is pulsed the resulting demodulated pulsed-audio or ringing wave form from FM demodulator 56 is also present across potentiometer 76, where an adjustable amplitude output is obtained from the slider of 76. The selector or slider of 76 is adjusted for the required amplitude necessary to reject all containers on conveyor 1 that have a vacuum equal to or less than a predetermined amount, and, therefore, a signal equal to or greater than a given amount, set by the ejection threshold (to be described in the following). The signal derived from the selector of 76 is coupled to the input of the audio frequency amplifier 58 by way of the temperature compensating resistance network 13 and 49 and DC blocking capacitor 134, presented to the base input of the first emitter follower transistor 127. Resistors 80 and 81 provide the required base biasing resistances where resistor 82 provide the emitter output load resistance. The output signal from the emitter of 127 is coupled by DC blocking capacitor 83 to the base input of amplifying transistor 128, where similarly resistors 84 and 85 provide the required base biasing for transistor 128. Emitter resistor 86 provides degeneration and the signal from the collector output of 128 is provided across the primary of transformer 87. The derived output across the secondary of transformer 87 is then applied to the input of transistor 102 and is combined with the DC biasing voltage provided by the divider network resistors 90 and 91. Transformer 87 serves to form the required impedance match between the input of transistor 102 and the collector output of transistor 128 and provides a low impedance signal source for driving transistor 102. Capacitor 88 comprises a high frequency bypass eliminating high frequency transients of no interest in controlling. Capacitor 89 provides the required audio frequency by-passing so that one side of the transformer 87 secondary is effectively at AC ground.

At the same time that container 2 in FIGURE 1 is pulsed, a negative going trigger signal provided from connector 39 is connected to input connector 52, which causes the single shot gate multi-vibrator circuit 59 to be activated. In its stable state, transistor 99 is cut off being base biased at an extremely low value as set by its biasing resistors 98 and 97, and resistor 107 is its collector load. Transistor 100 on the other hand is base biased extremely negative into heavy conduction by resistor 109 where resistor 108 is its collector load. Positive feed back from transistor 100 returning to transistor 99 is provided through resistor divider netwok 97 and 98 and commutating capacitor 132. Resistor 106 provides the required common emitter DC operating bias drop. A change in collector voltage of transistor 99 is coupled to the base of transistor 100 by capacitor 129, where capacitor 129 and resistance 109 determine the negative output pulse width provided from the collector of transistor 100 which is tied to the base of emitter follower transistor 101 causing transistor 101 to conduct proportionately and, therefore, reproducing the same negative pulse at its emitter. A negative pulse then provided at input 52 is differentiated by the network consisting of capacitor 94 and resistor 95 causing a narrower pulse to be provided across resistor 95. The negative pulse resulting across resistor 95 causes diode 96 to conduct and pull the base of transistor 99 highly negative to cause conduction. When transistor 99 conducts its collector voltage change is coupled then to the base of transistor 100, causing transistor 100 to cut off and its collector voltage to rise more negative and finally providing a negative pulse at the output of emitter follower transistor 101.

The negative pulse provided from the emitter output of transistor 101 is applied across the gated amplifier 151, including transistor 102, and allows this transistor to amplify the pulsed audio or ringing signal (produced from lid 5 deflections) resulting at its base input from the secondary of transformer 87. The amplified audio "burst" from the collector output of transistor 102 is present across the primary of transformer 126 and, therefore, across its center tapped secondary. This circuit, then produces a coherent audio burst signal of various amplitudes at its output each time lid 5 is pulsed by core 3 in FIGURE 1. Resistor 93 forms an emitter decoupling resistance from transistor 101 where capacitor 110 bypasses the high frequency transient produced by the fast rise of the negative output at the emitter of transistor 101. Resistor 111 is used as an emitter degeneration drop for transistor 102. The gate width (time) for the gated amplifier transistor 102 is determined by appropriately selected values of multi-vibrator 59 timing resistor 109 and capacitor 129 so that at least one cycle of the lowest expected ringing frequency can be produced across the secondary output of transformer 126. An appropriate read-out device such as an oscillograph (fast strip chart recorder) or oscilloscope 61 connected to connector 60 and, therefore, tied across one-half of the secondary of transformer 126 may be used to record the lid 5 deflections, as each container 2 is passed under core 3 while travelling on conveyor 1. In operation, this system somewhat resembles an electrocardiogram recording heartbeats.

As a further and important feature of the present invention, not only will the present apparatus faithfully reproduce the internal pressure of each of the containers travelling on conveyor 1, as above described, but in addition thereto and as hereinabove noted, ejector means is provided for physically displacing substandard containers off from conveyor 1 as depicted by arrow 140. For this purpose an ejector solenoid 63 is located just downstream from core 3 so that the plunger 141 of solenoid 63 will engage and laterally displace from conveyor 1 any container leaving core 3 which is substandard. An ejector circuit to activate ejector solenoid 63 consists of an ejector multivibrator 62, which is a single-shot multivibrator, basically identical to the former mentioned gate multivibrator 59. Similarly as before, transistor 103 initially is cut off and transistor 104 is in full conduction. Resistors 116 and 117 and capacitor 118 make up the require positive feedback network to the base of transistor 103. Resistor 119 provides the required DC operating bias. Resistor 123 is the collector load for transistor 103 and resistor 120 is the collector load for transistor 104 and resistor 121 provides full conducting base bias for transistor 104. As before, the multivibrator's RC time constant is set by coupling capacitor 131 and resistor 121 and for all practical purposes should produce an output pulse width sufficiently wide to allow for proper ejector timing. When a negative going signal is applied to the base of transistor 103 by way of coupling diode 115, similarly as before, transistor 103 is turned on, causes transistor 104 to cut off and, therefore, emitter follower transistor 105 to conduct and relay solenoid 124 is activated to close its contacts 130. When contacts 130 are closed power from supply 133 is supplied to the ejector solenoid 63, through connector 152, and, by properly positioning the ejector solenoid on the conveyor line 1 slightly downstream from core 3, the faulty container 2, after being "sensed," will be pushed off the line by ejector plunger 141 as indicated by arrow 140. A slight time delay, in this system, is required to allow container 2 to travel into registration with the ejector, and may be met by the time required for relay solenoid 124 to close its contacts 130. Diode 125 quenches the back EMF from solenoid 124 when transistor 105 ceases to conduct. The negative triggering signal for multivibrator 62 is provided by the output pulsed audio signal from the secondary of transformer 126 where the output wave form is reshaped by the full wave diode arrangement consisting of diodes 112 and 113 to produce a full wave unfiltered negative going wave form across diode load resistance potentiometer 114. The slider output of potentiometer 114, adjusted for the required triggering level or threshold, is applied to the base of transistor 103 through diode 115.

The pulsed AC or sinusoidal wave form produced from the lid's deflection may be so phased that at connector 60 representing one-half of the output of transformer 126 will be in phase with that of the actual lid 5 deflections; i.e. an upward deflection representing the positive going excursion of the wave form. The output wave form from the opposite end of the secondary of 126 at the cathode of 112 will be reversed phase. Usually the upward deflection of lid 5 will produce the largest change in voltage in respect to the zero level of the pulsed AC wave form; therefore, the negative excursion of this signal through the conduction of diode 112 and derived across potentiometer 114 results in the determining portion of the signal that triggers the ejector multi-vibrator 62. On the other hand, if the downward swing of lid 5 produces a larger excursion in the negative region, then the output across resistor 114 produced by the conduction cycle of diode 113 will be the determining factor for ejection. To set the ejection threshold of this system, a sample container 2 containing a vacuum at a minimal amount desired may be placed under core 3 while conveyor 1 is shut down. Lid 5 may then be pulsed by manual operation of the pulse circuit 4. While manually pulsing lid 5, the pulsed audio signal level at the output of transformer 126, as seen by the oscillograph (or oscilloscope) 61, may be adjusted for an appropriate amplitude by the potentiometer 76. With a sufficient amplitude of signal displayed by oscillograph 61 and, therefore, at the output of transformer 126, the trigger level potentiometer 114 should be adjusted from its minimal voltage point to a higher level until ejection multivibrator 62 activates and, therefore, ejector 63 is energized. The sample container 2 should be kept at a temperature close to that of the containers that are to be measured, since the apparent vacuum in each container 2 will decrease with increasing temperatures.

Figure 2:
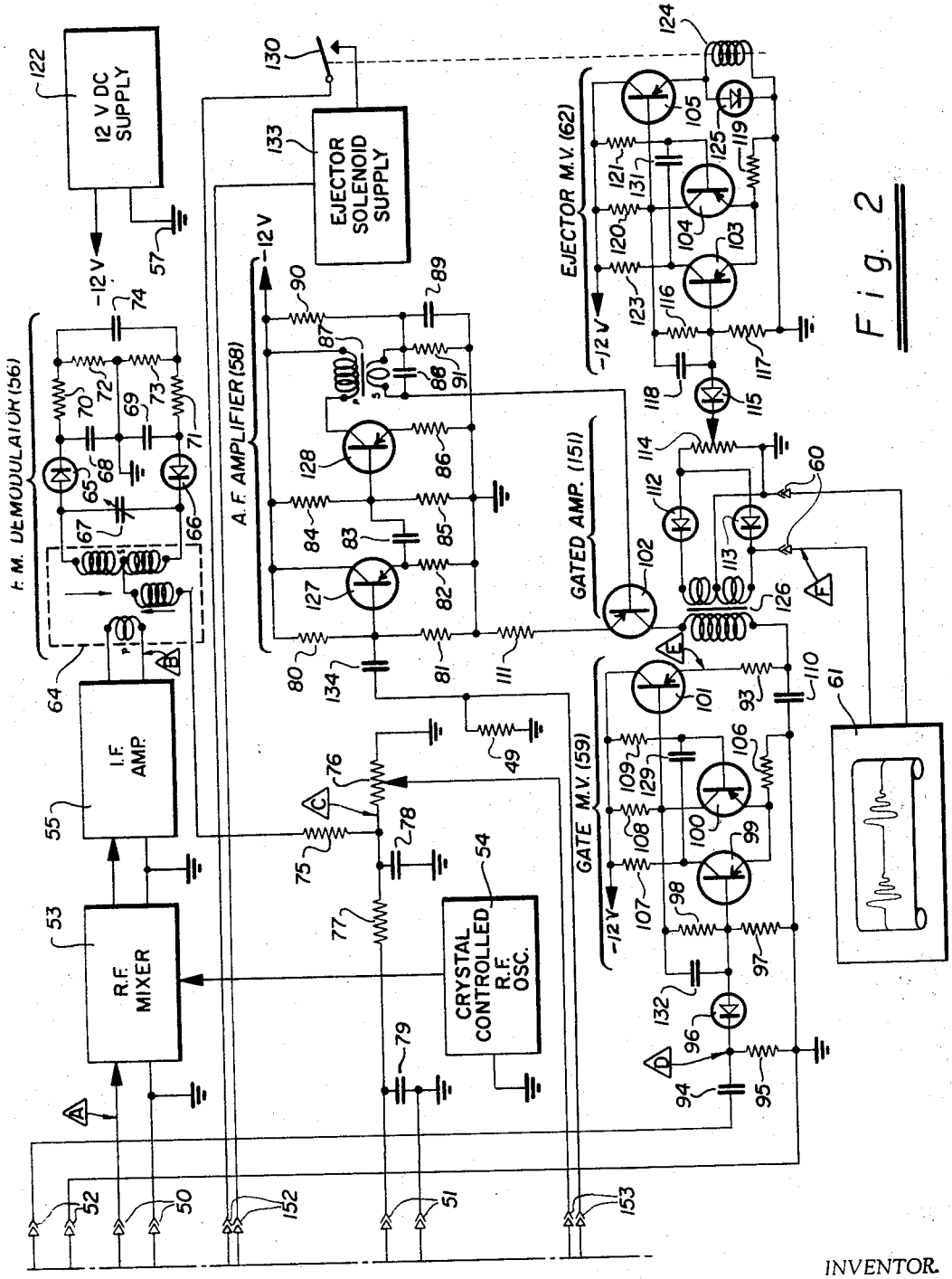
FIGURE 2 is a schematic wiring diagram of the balance of the apparatus.

The temperature sensing device 13 is preferably placed above the containers on conveyor line 1 upstream of the magnetic core 3 for sensing the temperature of the oncoming containers to be sorted by the present device. Device 13 is here a temperature sensitive wire element having a positive temperature coefficient and is used to electrically add to or subtract from the attenuation that is initially set by the audio level potentiometer 76. With reference to FIGURE 2 it will be seen that element 13 is connected to connector 153 and is included in an appropriate attenuator network with fixed resistor so that the input signal to the audio frequency amplifier 58 is decreased with an increasing of averaged temperature rise as measured above all passing containers 2 some point prior to core 3. The temperature sensing element's sensitivity to temperature changes for a given resistance change and, therefore, an input level change to audio frequency amplifier 58 should be made adjustable so that after the proper ejection threshold at a given temperature is set up, any temperature changes are exactly compensated for by the resulting input audio change.

Figure 3:
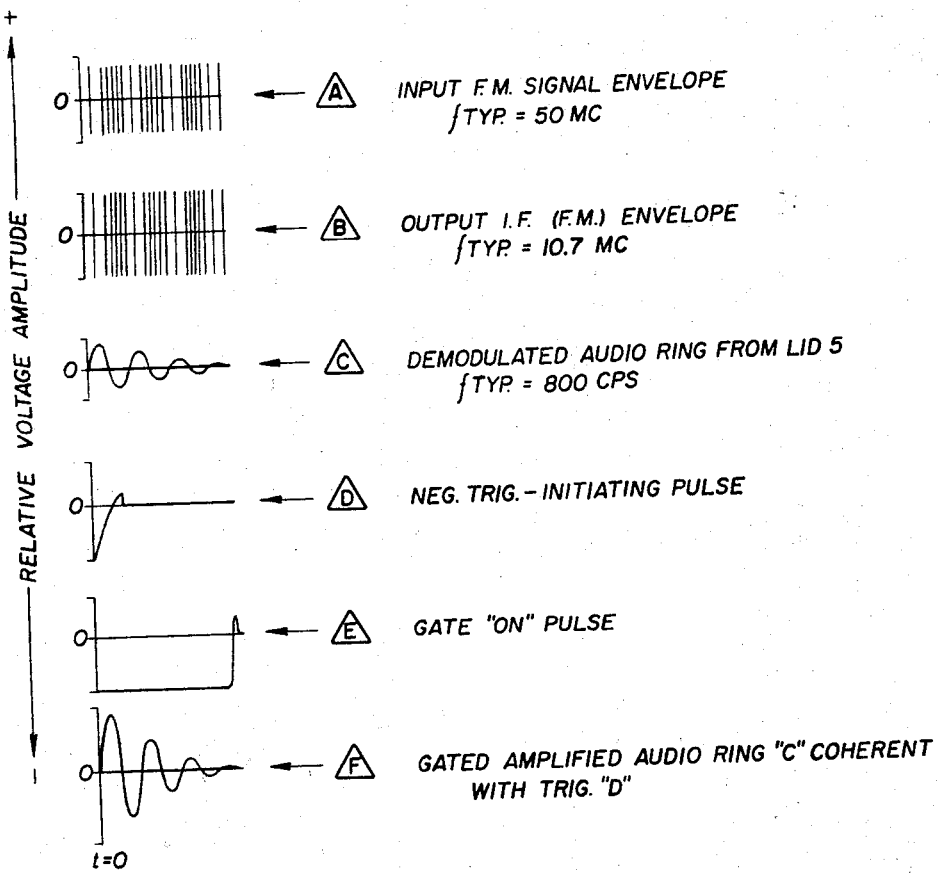
FIGURE 3 is a diagrammatic representation of wave forms appearing at designated portions of the electronic circuitry.

The operation of the present apparatus and method will also be clear from a study of the several wave forms and brief descriptions thereof included in FIGURE 3. As will be noted, the several wave forms depicted in FIGURE 3 are keyed by appropriate reference symbols to various portions of the circuitry shown in FIGURE 2.

As will be understood from the foregoing, the method and apparatus of the present invention will operate at high speed well above that required for modern high speed canning production lines. For example, the magnetic pulsing of the can lid and its displacement can be done in the order of one millisecond. At the same time the method and apparatus of the present invention will determine the minimum threshold passing standard of internal pressure with high precision and accuracy and may be adjusted to meet the demands of the individual products as may from time to time be handled on the conveyor line. Also the sensing can be done in any required positioning of the container, as for example on its side as in the case of a rolling can chute conveyor.

I claim:

1. A container sorting apparatus comprising, means for pulse energizing a displaceable wall of a sealed container to effect displacement thereof as a function of internal container pressure, and electrostatic pick-up means adapted for mounting in spaced relation to said wall and providing an output signal continuously varying as a function of said displacement.

2. A container sorting apparatus as defined in claim 1, wherein said container wall is metallic and said first-named means comprises a magnetic field generating device, and means pulse energizing said device.

3. A container sorting apparatus as defined in claim 2, a conveyor for transporting containers to be sorted to said device, said pulse energizing means functioning to automatically energize said device upon alignment of a container therewith, said pick-up means functioning concurrently with said wall pulsing means, and container ejector means connected to and functioning concurrently with said pick-up means and responsive to a signal of predetermined magnitude therefrom to eject said container from said conveyor, whereby the pulsing and sensing and ejection operations occur in high speed sequence providing substantially instantaneous sorting.

4. A container sorting apparatus as defined in claim 3, and a gated amplifier connected between said pick-up means and said container ejector means, said gated amplifier being connected to said pulse energizing means for turning on of said amplifier only when said container is in alignment with said magnetic device.

5. A container sorting apparatus as defined in claim 2, wherein said device comprises, an electromagnetic field winding, said means energizing said magnetic device comprises, a plurality of capacitors, means charging said capacitors, means discharging said capacitors through said winding to produce a high energy magnetic pulse and means selecting said capacitors to select the discharge time and magnetic rise characteristics of said device.

6. A container sorting apparatus as defined in claim 2, wherein, said said device comprises, an electromagnetic field winding, said means energizing said device comprises, electrical power storage means, means charging said storage means, a triggering circuit connected between said storage means and winding and providing a normally non-conducting path therebetween, and a switch means mounted for closing by said container upon movement into alignment with said magnetic device and functioning upon closing to fire said triggering circuit to provide a conducting path between said storage means and winding.

7. A container sorting apparatus as defined in claim 2, wherein said magnetic device comprises a magnetic core formed for positioning in opposed relation to an end wall of said container centrally thereof, and said pick-up means is an electrostatic plate mounted centrally of said core.

8. A container sorting apparatus as defined in claim 1, and container temperature sensing means connected for controlling said output signal as a function of container temperature.

9. A container sorting apparatus as defined in claim 1, wherein said container wall is metallic and said pick-up means comprises an electrical conductor plate co-functioning with said container wall to provide a capacitance varying in capacity as function of displacement of said wall.

10. A container sorting apparatus comprising, a magnetic field generating device including a magnetic core and winding, a conveyor for transporting containers to be sorted to said device and positioning a deflectable end wall of said container in opposed relation to said core centrally thereof, electric power storage means, a switch controlled triggering circuit connected between said storage means and winding and providing upon closing of said switch for discharging said storage means through said winding to produce a high energy magnetic pulse for flexing said container wall as a function of internal container pressure, means closing said switch upon movement of a container to said device, an electrostatic pick-up plate mounted centrally of said core and co-functioning with said container wall to provide a capacitance varying in capacity as a function of displacement of said wall, frequency oscillator and demodulator circuitry connected to said pick-up plate and providing a signal from the pulsing of said container wall, and container ejector means connected to said circuitry and responsive to said signal of predetermined magnitude to reject said container from said conveyor.

11. A container sorting apparatus as defined in claim 10, a gated amplifier connected to said oscillator and demodulator circuitry and being connected to said storage means and triggering circuit for turning on said amplifier only when said container wall is pulsed, a read-out device connected to said gated amplifier, and a multivibrator circuit connecting said gated amplifier to said container ejector means for energizing the latter in response to a predetermined threshold signal from said gated amplifier.

12. The method of monitoring the internal pressure of containers which comprises, impulsively deflecting a deflectable wall of the container with an energy pulse and concurrently measuring the dynamic movement of said wall as a function of internal container pressure by an electrostatic pick-up forming a variable electrostatic effect with the container wall.

References Cited

UNITED STATES PATENTS

| 1,956,301 | 4/1934 | Richardson. | |
|---|---|---|---|
| 2,608,089 | 8/1952 | Raymond | 73—52 |
| 3,088,591 | 5/1963 | Perthen | 209—88 |
| 3,206,027 | 9/1965 | Bailey | 209—111.8 |

M. HENSON WOOD, JR., *Primary Examiner.*

R. A. SCHACHER, *Assistant Examiner.*

U.S. Cl. X.R.

73—45.2, 52; 209—111.8